United States Patent [19]

McDaniel

[11] 4,194,073

[45] Mar. 18, 1980

[54] OLEFIN POLYMERIZATION

[75] Inventor: Max P. McDaniel, Bartlesville, Okla.

[73] Assignee: Phillips Petroleum Company, Bartlesville, Okla.

[21] Appl. No.: 866,900

[22] Filed: Jan. 4, 1978

[51] Int. Cl.$^2$ .............................................. C08F 4/24
[52] U.S. Cl. .................................... 526/98; 526/106; 526/352; 526/903
[58] Field of Search ........................ 526/98, 106, 903

[56] References Cited

U.S. PATENT DOCUMENTS

| 3,846,392 | 11/1974 | Matsumura et al. ................. 526/98 |
| 3,891,611 | 6/1975 | Abe et al. ............................. 526/903 |
| 3,970,613 | 7/1976 | Goldie et al. ........................ 526/106 |

*Primary Examiner*—Stanford M. Levin

[57] ABSTRACT

Higher melt index 1-olefin polymers are produced by polymerizing the monomers in contact with a supported chromium oxide catalyst and an aromatic compound, e.g. benzene. The aromatic compound can be added as a separate stream to the reactor before, during or after charging the diluent to the reactor or the catalyst can be pretreated with the aromatic compound prior to charging the catalyst to the reactor.

18 Claims, 1 Drawing Figure

OLEFIN POLYMERIZATION

BACKGROUND OF THE INVENTION

This invention relates to the polymerization of olefins. In another aspect, this invention relates to the polymerization of 1-olefins in the presence of a chromium oxide catalyst and an adjuvant. In another aspect, this invention relates to a method of polymerizing 1-olefins in the presence of a catalyst such as chromium oxide and an aromatic compound such as benzene, o-xylene, monohalogenated derivatives of benzene and o-xylene and mixtures thereof. In yet another aspect, this invention relates to the polymerization of 1-olefins in the presence of a supported chromium oxide catalyst that has been pretreated with an aromatic compound such as benzene, o-xylene, a monohalogenated derivative of benzene or o-xylene or mixtures thereof.

High melt index is an important characteristic in a polymer. Since melt index is indicative of molecular weight and thus is further a measure of flow of the polymer, the higher the melt index of the polymer the better the polymer will perform for purposes where complete polymer flow to fill a mold, or the like, is required for the formation of an article prior to experiencing any setting of the polymer. A method to obtain polymers having a high melt index, therefore, is of significant value to the art.

It has now been discovered in accordance with this invention that the use of an adjuvant, which consists essentially of at least one aromatic compound selected from among benzene, o-xylene, and monohalogenated derivatives thereof, results in the production of a polymer having a higher melt index relative to polymers made under similar conditions in the absence of the adjuvant.

It is an object of the present invention, therefore, to provide an improved method for producing polymers and copolymers of 1-olefins.

Another object of the present invention is to provide a method for producing polymers and copolymers of 1-olefins having an increased melt index.

Other aspects, objects, and the several advantages of this invention will be apparent from the disclosure and the appended claims.

SUMMARY OF THE INVENTION

This invention concerns the production of normally solid 1-olefin homopolymers or copolymers thereof with a supported chromium oxide catalyst and an aromatic compound as an adjuvant for the catalyst. The polymers are made by contacting the appropriate monomers with the catalyst and adjuvant under polymerization conditions.

The aromatic compounds contemplated in practicing the invention are selected from among benzene, o-xylene, the monohalogenated derivatives of benzene and o-xylene and mixtures thereof. Benzene is the presently preferred compound.

In one embodiment, the adjuvant can be added as a separate stream to the reactor before, during or after the charging of the diluent. In a second embodiment, the catalyst can be pretreated with the adjuvant prior to charging the catalyst to the reactor. A combination of the two embodiments is also contemplated within the scope of this invention, i.e. charging adjuvant to the reactor as a separate stream as well as pretreating the catalyst to be used.

DETAILED DESCRIPTION OF THE INVENTION

Figure 1:
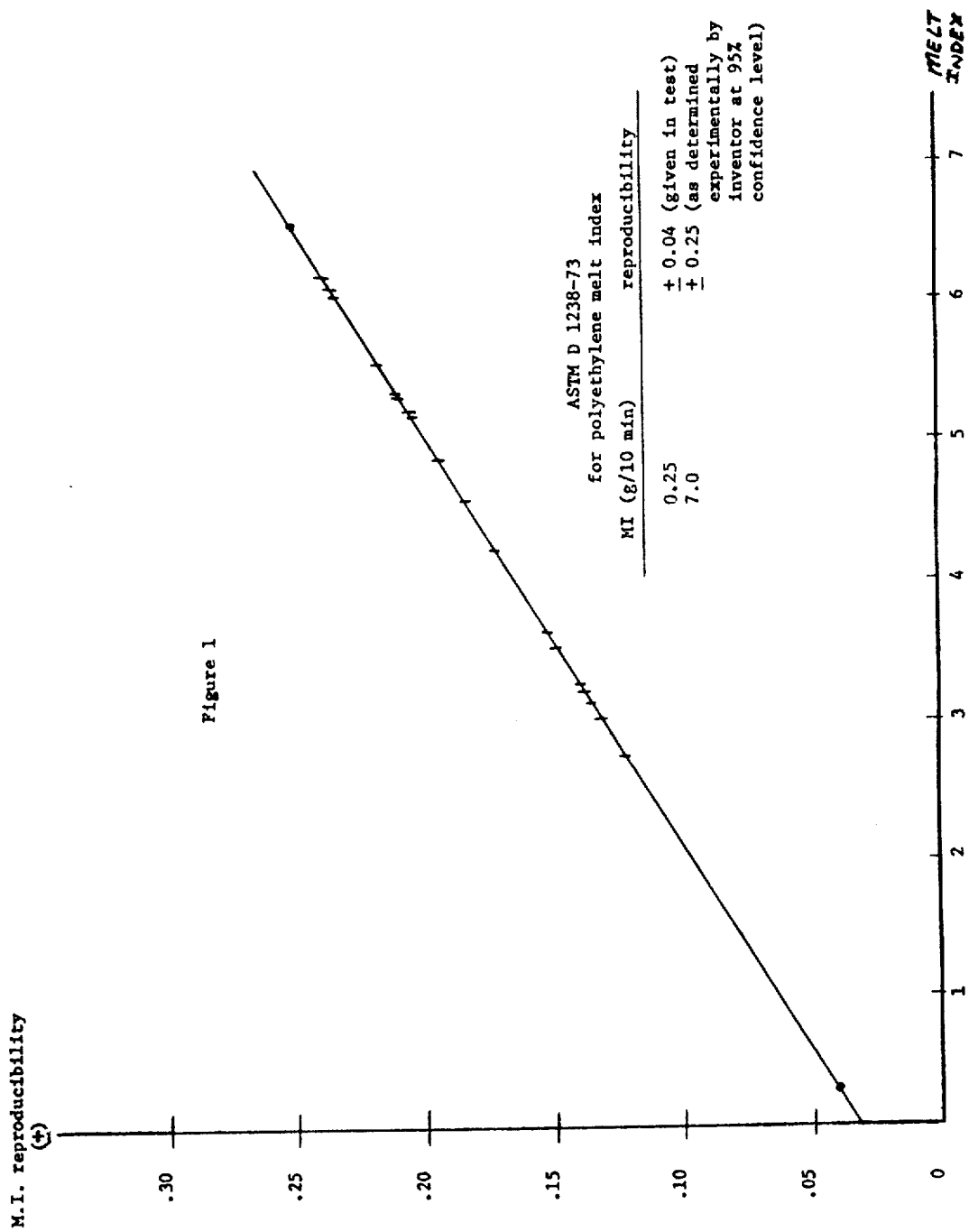

In the process of this invention, a supported chromium oxide catalyst and an aromatic compound as an adjuvant for the catalyst are contacted with 1-olefins under polymerization conditions to produce normally solid 1-olefin homopolymers or 1-olefin copolymers. Appropriate polymerization conditions are any of the well-known polymerization processes in the art utilizing a chromium oxide catalyst. The preferred polymerization conditions of the present invention are those of a particle form polymerization process. Such conditions are disclosed in U.S. Pat. No. 3,950,316. The melt index of the polymers produced according to this invention are increased relative to polymers made under similar conditions in the absence of the adjuvant and such differences are more clearly observed in the particle form process.

The aromatic compounds contemplated in practicing the instant invention are selected from among benzene, o-xylene, the monohalogenated derivatives of benzene and o-xylene and mixtures thereof. Exemplary compounds include fluorobenzene, chlorobenzene, bromobenzene, 1,2-dimethyl-4-chlorobenzene and the like. Benzene is the presently preferred compound.

The supported chromium oxide catalyst used in the process of the instant invention can utilize any of the various commercially available heat resistant oxides, such as silica, alumina or silica-alumina, as a catalyst support. Chromium oxide catalyst such as those consisting of chromium oxide, silica and titanium are also appropriate. The chromium oxide component of the catalyst system is placed on the catalyst support by any of the several conventional methods, such as impregnation, distillation, sublimation, or the like, followed by calcination. Suitable chromium compounds which may be used include chromium oxides, halides, oxyhalides, phosphate, sulfate, oxalate, nitrates, acetates, alcoholates or other organochromium compounds convertible to chromium oxide by calcination. The chromium compound is supported on the heat resistant oxide support and the supported chromium compound is calcined to activate the catalyst component.

The calcination process for activation of the catalyst component is conducted by heating in a stream of gas, it is preferred that the gas contain oxygen and be substantially water-free. Inert gases, however, such as carbon dioxide and nitrogen, can be used. Suitable calcination temperatures usually range from 450° to 2,200° F., preferably 750° to 2,000° F. and the calcination time usually ranges from anywhere between several minutes to 30 or 40 hours, preferably in the range of 30 minutes to 10 hours.

The polymerization to which the present invention is applicable is the polymerization of at least one polymerizable 1-olefin, preferably normally solid homopolymers of ethylene or copolymers of ethylene, with another 1-olefin containing 3–8 carbon atoms per molecule. As an example, the olefin polymer can be produced from at least one aliphatic mono-1-olefin having 2–8 carbon atoms per molecule. Exemplary copolymers include those of ethylene/propylene, ethylene/1-butene, ethylene/1-hexene, ethylene/1-octene and the like. The major portion of said copolymers is derived from ethylene. These polymers are well suited for extrusion, blow molding, injection molding, and the like.

Suitable diluents for the polymerization medium include hydrocarbons having 3 to 12 carbon atoms per molecule such as paraffins, cycloparaffins, and aromatics with the paraffinic hydrocarbons being more preferred. Exemplary diluents include n-butane, isobutane, n-pentane, isopentane, n-hexane, 2,2,4-trimethylpentane, cyclopentane, cyclohexane, methylcyclohexane, n-dodecane and mixtures thereof.

The amount of diluent used depends upon the particular polymerization process used, the details of which are generally well-known in the art. For example, in a particle form process, the diluent is generally present in a sufficient amount to ensure that the 1-olefin monomer concentration is of the order of 2-10 weight percent although concentrations outside this range can be employed if desired.

In one embodiment of the present invention, the adjuvant can be added as a separate stream to the reactor before, during or after the charging of the diluent to the reactor. The amount of adjuvant charged to the reactor can vary from about 1 to about 800 ppm, more preferably from about 1 to about 500 ppm, based on the weight of diluent contained in the reactor.

In a second embodiment, the catalyst can be pretreated with the adjuvant of the instant invention prior to charging the catalyst to the reactor. In pretreating the catalyst with the adjuvant, the catalyst is first activated normally in a fluidized bed with dry air and reduced by a suitable reducing agent such as carbon monoxide or the like. While excluding air, the reduced catalyst is then contacted with vapors of the adjuvant sufficient to add at least 1 mole of the adjuvant per mole of chromium present in the catalyst to produce the modified catalyst. After the treatment, the catalyst is ready to be charged to the reactor.

Adjuvant in excess of 1 mole per mole of chromium does not bond with the chromium, but can be utilized as though added in a separate stream to the reactor as disclosed in embodiment 1. A combination of the two embodiments, that of pretreating the catalyst with the adjuvant and also adding the adjuvant as a separate stream to the reactor, is contemplated within the scope of the present invention.

The 1-olefin polymers made in the presence of the adjuvants, particularly in a particle form polymerization process, exhibits an increase in melt index as determined by ASTM D 1238-73 at 190° C. and a load of 2160 grams compared to polymers made under the same conditions but in the absence of the adjuvants. The amount of melt index increase expected can range from about 5 to about 25% as calculated from the actually determined values of the polymers made.

The following examples are set forth as illustrative of the process of this invention and are not meant to be restrictive.

The data obtained in the following examples were analyzed with respect to the experimental error for the melt index values using FIG. 1. In the ASTM test, reproducibility at a melt index of 0.25 is ±0.04 and at a melt index of 7.0 is ±0.34. However, a variation of ±0.25 is being used for 6-7 M.I. polymers in view of a study made by the inventor. Assuming linearity between the M.I. values, the amount of experimental error for melt index values between them can be estimated from a curve based on the points. FIG. 1 represents such a curve and is, therefore, being used.

EXAMPLE 1

A series of runs was made in a particle form polymerization process by contact of ethylene with a supported chromium oxide catalyst (cogel) containing 2.5 wt.% Ti, 1 wt.% Cr and the balance silica based on the dry components. The catalyst was activated by heating it at 1600° F. (871° C.) in dry air for 4 hours. Portions of the catalyst (0.03-0.07 g range) were individually charged to the stirred reactor. Adjuvant was added, isobutane (570 g) was charged and the reactor and contents were heated to 230° F. (110° C.), sufficient ethylene was admitted to reach a pressure of 550 psig (3.8 MPa gage) and the run was started. Ethylene was added on demand as required during the run to maintain the pressure at 550 psig. Each run was of sufficient duration to obtain about 5000 g polymer per g catalyst. Melt index values are corrected to a productivity level of 5000 g polymer per g catalyst to accurately compare results. The adjuvant and quantity thereof charged to the reactor and results obtained are given in Table 1. The percent increase or decrease in melt index shown is based solely on the actual melt index values determined for each run. The calculated melt index ranges are based on the estimated reproducibilities at a given melt index shown in FIG. 1.

The results presented in Table 1 show that benzene and fluorobenzene are effective as reactor adjuvants in promoting an increase in polymer melt index during polymerization of ethylene even when taking into account the experimental variation possible in melt index determinations. The data show that toluene, p-xylene and p-dibromobenzene are of little or no value as reaction adjuvants under the conditions employed. The reason for the spurious results shown in run 3 in which a suitable quantity of benzene was used is not known. Run 1 demonstrates that 1565 ppm benzene tends to depress polymer melt index and catalyst activity based on polymer melt index and polymerization time required. This effect is noted at 313 ppm with p-xylene in run 8. The borderline results with 783 ppm benzene in run 2 are used as the basis for establishing 500 ppm as a probably reasonable upper limit for the reactor adjuvants.

Table 1

| | | | | Ethylene Polymerization with Aromatic Reaction Adjuvant | | | | | |
|---|---|---|---|---|---|---|---|---|---|
| | | | Melt Index Values | | | | Melt Index | Polymerization Time, minutes | |
| Run No. | Reactor Adjuvant Description | PPM | With Adjuvant | Calculated Range | Without Adjuvant | Calculated Range | Increase % | With Adjuvant | Without Adjuvant | Remarks |
| 1 | benzene[a] | 1565 | 4.48 | 4.31–4.65 | 4.86 | 4.68–5.04 | −7.8 | 70 | 44 | Comparison |
| 2 | benzene[a] | 783 | 5.16 | 4.97–5.35 | 4.86 | 4.68–5.04 | 6.2 | 57 | 44 | Comparison |
| 3 | benzene[a] | 313 | 5.93 | 5.71–6.15 | 5.55 | 5.35–5.75 | 6.8 | 53 | 45 | Anomalous result |
| 4 | benzene[a] | 313 | 6.44 | 6.21–6.67 | 5.66 | 5.46–5.86 | 14. | 49 | 65 | Invention |
| 5 | benzene[a] | 313 | 6.62 | 6.38–6.86 | 5.70 | 5.49–5.91 | 16. | 52 | 45 | Invention |

Table 1-continued

Ethylene Polymerization with Aromatic Reaction Adjuvant

| Run No. | Reactor Adjuvant Description | PPM | Melt Index Values With Adjuvant | Calculated Range | Without Adjuvant | Calculated Range | Melt Index Increase % | Polymerization Time, minutes With Adjuvant | Without Adjuvant | Remarks |
|---|---|---|---|---|---|---|---|---|---|---|
| 6 | benzene[a] | 313 | 6.51 | 6.28–6.74 | 5.67 | 5.47–5.87 | 15. | 57 | 47 | Invention |
| 7 | toluene | 313 | 5.33 | 5.13–5.53 | 5.22 | 5.03–5.41 | 2.1 | 55 | 45 | Comparison |
| 8 | p-xylene | 313 | 2.24 | 2.14–2.34 | 5.21 | 5.01–5.41 | −57. | 130 | 70 | Comparison |
| 9 | fluorobenzene | 300 | 6.07 | 5.85–6.29 | 5.52 | 5.32–5.72 | 10. | 41 | 42 | Invention |
| 10 | p-dibromobenzene | 2 | 5.62 | 5.42–5.82 | 5.45 | 5.35–5.65 | 3.1 | 45 | 46 | Comparison |

[a] Thiophene free.

EXAMPLE 2

Portions of the catalyst used in the first example were activated by heating them in dry air for 4 hours at 1600° F. While the temperature was being reduced to about 600°–700° F. (315°–371° C.) the air was flushed out with dry nitrogen replaced with dry CO while maintaining the temperature in the 600°–700° F. range for about 1 hour to reduce the chromium to a coordinately unsaturated state. The carbon monoxide was then flushed out with dry nitrogen while maintaining the temperature at 600°–700° F. and the temperature was reduced to about 25° C. in the presence of nitrogen. Each reduced catalyst portion was then contacted with sufficient adjuvant vapor to add one mole thereof per mole of chromium present in the catalyst. The treated catalyst was charged to the reactor without further treatment along with isobutane diluent and ethylene. Polymerization was conducted at 230° F. and 550 psig in the presence of about 570 g isobutane diluent and 0.05–0.07 g catalyst. The adjuvants employed and results obtained are given in Table 2. The calculated melt index ranges and % increase in melt index shown are given on the same basis as in the first example.

The data presented in Table 2 show that reduced supported chromium oxide catalysts contacted with either benzene, o-xylene or fluorobenzene prior to being used in polymerizing ethylene have their melt index capability improved by the treatment. The results show that iodobenzene and perfluorobenzene, on the other hand, have little or no effect on improving catalyst melt index capability under the conditions employed.

produced having an increased melt index relative to polymers made under similar conditions in the absence of the fluorobenzene.

2. A polymerization process for the polymerization of 1-olefins in the presence of a chromium oxide catalyst and a liquid diluent which comprises the steps of:
(a) reducing said chromium oxide catalyst with a suitable reducing agent,
(b) contacting said reduced catalyst with vapors of at least one aromatic compound selected from the group consisting essentially of: benzene, o-xylene, the fluorine, chlorine, and bromine monohalogenated derivatives of benzene and o-xylene and mixtures thereof, under such conditions as to add at least one mole of said aromatic compound per mole of chromium present in the catalyst,
(c) charging said pretreated chromium oxide catalyst to the reactor and then polymerizing said 1-olefin, and
(d) adding to the reactor either before, during or after the charging of the diluent to the reactor additional aromatic compound.

3. A process according to claim 2 wherein said suitable reducing agent of step (a) is carbon monoxide.

4. A process according to claim 2 wherein said aromatic compound is benzene.

5. A process according to claim 2 wherein said aromatic compound is o-xylene.

6. A process according to claim 2 wherein said aromatic compound is fluorobenzene.

7. A process according to claim 2 wherein the polymerization of the 1-olefin is a particle form polymeriza- Table 2

Ethylene Polymerization with Treted Catalyst

| Run No. | Catalyst Weight g | Treated Catalyst Adjuvant | Color | Melt Index Values Treated | Calculated Range | Untreated | Calculated Range | Melt Index Increase % | Polymerization Time, minutes Treated | Untreated |
|---|---|---|---|---|---|---|---|---|---|---|
| 1 | 0.0558 | benzene | green | 3.82 | 3.67–3.97 | 2.92 | 2.80–3.04 | 24. | 84 | 93 |
| 2 | 0.0599 | benzene | green | 4.10 | 3.94–4.26 | 3.40 | 3.26–3.54 | 17. | 72 | 75 |
| 3 | 0.0527 | o-xylene | green | 3.71 | 3.56–3.86 | 3.26 | 3.13–3.39 | 8.0 | 85 | 81 |
| 4 | 0.0665 | fluorobenzene | green | 3.38 | 3.24–3.52 | 3.26 | 3.13–3.39 | 3.7 | 95 | 81 |
| 5 | 0.0648 | perfluorobenzene | green | 3.04 | 2.91–3.17 | 3.40 | 3.26–3.54 | −11. | 94 | 75 |
| 6 | 0.0518 | iodobenzene | brown | 3.15 | 3.02–3.28 | 3.26 | 3.13–3.39 | −3.4 | 80 | 81 |

Certain modifications of the invention will become apparant to those skilled in the art and the illustrative details enclosed are not to be construed as imposing unnecessary limitations on the invention.

We claim:

1. A process for the polymerization of 1-olefins in the presence of a chromium oxide catalyst and a liquid diluent which comprises adding to the reactor either before, during or after the charging of the diluent to the reactor an effective melt index increasing amount of fluorobenzene under such conditions that a polymer is tion process.

8. A process according to claim 2 wherein said 1-olefin is ethylene.

9. A process for the polymerization of 1-olefins in the presence of a chromium oxide catalyst the improvement which comprises: carrying out said polymerization in the presence of an effective melt index increasing amount of at least one aromatic compound selected from the group consisting essentially of the fluorine, chlorine and bromine monohalogenated derivatives of benzene and mixtures thereof, under such conditions that a polymer is produced having an increased melt index relative to polymers made under similar conditions in the absence of the aromatic compound.

10. A process according to claim 9 wherein said aromatic compound is fluorobenzene.

11. A process according to claim 9 wherein the amount of aromatic compound used is from about 1 to about 500 ppm based on the weight of diluent that is contained in the reactor.

12. A process according to claim 9 wherein the polymerization of the 1-olefin is a particle form polymerization process.

13. A process according to claim 9 wherein said 1-olefin is ethylene.

14. A polymerization process for the polymerization of 1-olefins in the presence of a chromium oxide catalyst and a liquid diluent which comprises the steps of:

(a) reducing said chromium oxide catalyst with a suitable reducing agent, (b) contacting said reduced catalyst with vapors of at least one aromatic compound selected from the group consisting essentially of: the fluorine, chlorine and bromine monohalogenated derivatives of benzene and mixtures thereof, under such conditions as to add at least one mole of said aromatic compound per mole of chromium present in the catalyst, and (c) charging said pretreated chromium oxide catalyst to the reactor and then polymerizing said 1-olefin.

15. A process according to claim 14 wherein said aromatic compound is fluorobenzene.

16. A process according to claim 14 wherein said suitable reducing agent of step (a) is carbon monoxide.

17. A process according to claim 14 wherein the polymerization of the 1-olefin is a particle form polymerization process.

18. A process according to claim 14 wherein said 1-olefin is ethylene.

* * * * *